United States Patent [19]
Merchant et al.

[11] Patent Number: 6,163,838
[45] Date of Patent: *Dec. 19, 2000

[54] COMPUTER PROCESSOR WITH A REPLAY SYSTEM

[75] Inventors: Amit A. Merchant; David J. Sager, both of Portland; Darrell D. Boggs, Aloha, all of Oreg.

[73] Assignee: Intel Corporation, Santa Clara, Calif.

[*] Notice: This patent is subject to a terminal disclaimer.

[21] Appl. No.: 09/106,857

[22] Filed: Jun. 30, 1998

Related U.S. Application Data

[63] Continuation-in-part of application No. 08/746,547, Nov. 13, 1996, Pat. No. 5,966,544.
[51] Int. Cl.[7] .................................................. G06F 15/00
[52] U.S. Cl. ........................ 712/219; 712/23; 712/218
[58] Field of Search ........................... 712/23, 218, 219, 712/217, 227, 228

[56] References Cited

U.S. PATENT DOCUMENTS

| | | | |
|---|---|---|---|
| 3,736,566 | 5/1973 | Anderson et al. | 340/172.5 |
| 5,185,871 | 2/1993 | Frey et al. | 395/375 |
| 5,197,132 | 3/1993 | Steely, Jr. et al. | 712/217 |
| 5,341,482 | 8/1994 | Cutler et al. | 395/375 |
| 5,519,841 | 5/1996 | Sager et al. | 711/202 |
| 5,828,868 | 10/1998 | Sager et al. | 713/501 |
| 5,835,745 | 11/1998 | Sager et al. | 712/215 |
| 5,966,544 | 10/1999 | Sager | 395/800.32 |

Primary Examiner—Larry D. Donaghue
Attorney, Agent, or Firm—Kenyon & Kenyon

[57] ABSTRACT

A computer processor includes a multiplexer having a first input, a second input, and an output, and a scheduler coupled to the multiplexer first input. The processor further includes an execution unit coupled to the multiplexer output. The execution unit is adapted to receive a plurality of instructions from the multiplexer. The processor further includes a replay system coupled to the second multiplexer input and the scheduler. The replay system replays an instruction that has not correctly executed by sending a stop scheduler signal to the scheduler and sending the instruction to the multiplexer.

26 Claims, 6 Drawing Sheets

COMPUTER PROCESSOR WITH A REPLAY SYSTEM

CROSS-REFERENCE TO RELATED APPLICATIONS

This application is a continuation-in-part of application Ser. No. 08/746,547, filed Nov. 13, 1996 now U.S. Pat. No. 5,966,544.

FIELD OF THE INVENTION

The present invention is directed to a computer processor. More particularly, the present invention is directed to a computer processor with a replay system that replays instructions.

BACKGROUND OF THE INVENTION

The primary function of most computer processors is to execute computer instructions. Most processors execute instructions in the programmed order that they are received. However, some recent processors, such as the Pentium® II processor from Intel Corp., are "out-of-order" processors. An out-of-order processor can execute instructions in any order as the data and execution units required for each instruction becomes available. Therefore, with an out-of-order processor, execution units within the processor that otherwise may be idle can be more efficiently utilized.

With either type of processor, delays can occur when executing "dependent" instructions. A dependent instruction, in order to execute correctly, requires a value produced by another instruction that has executed correctly. For example, consider the following set of instructions:

1) Load memory-1→register-X;
2) Add1 register-X register-Y→register-Z;
3) Add2 register-Y register-Z→register-W.

The first instruction loads the content of memory-1 into register-X. The second instruction adds the content of register-X to the content of register-Y and stores the result in register-Z. The third instruction adds the content of register-Y to the content of register-Z and stores the result in register-W. In this set of instructions, instructions 2 and 3 are dependent instructions that are dependent on instruction 1 (instruction 3 is also dependent on instruction 2). In other words, if register-X is not loaded with the proper value in instruction 1 before instructions 2 and 3 are executed, instructions 2 and 3 will likely generate incorrect results. Dependent instructions can cause a delay in known processors because most known processors typically do not schedule a dependent instruction until they know that the instruction that the dependent instruction depends on will produce the correct result.

Referring now in detail to the drawings, wherein like parts are designated by like reference numerals throughout, FIG. 1 is a block diagram of a processor pipeline and timing diagram illustrating the delay caused by dependent instructions in most known processors. In FIG. 1, a scheduler 10 schedules instructions. The instructions proceed through an execution unit pipeline that includes pipeline stages 12, 14, 16, 18, 20, 22 and 24. During each pipeline stage a processing step is executed. For example, at pipeline stage 12 the instruction is dispatched. At stage 14 the instruction is decoded and source registers are read. At stage 16 a memory address is generated (for a memory instruction) or an arithmetic logic unit ("ALU") operation is executed (for an arithmetic or logic instruction). At stage 18 cache data is read and a lookup of the translation lookaside buffer ("TLB") is performed. At stage 20 the cache Tag is read. At stage 22 a hit/miss signal is generated as a result of the Tag read. The hit/miss signal indicates whether the desired data was found in the cache (i.e., whether the data read from the cache at stage 18 was the correct data). As shown in FIG. 1, the hit/miss signal is typically generated after the data is read at stage 18, because generating the hit/miss signal requires the additional steps of TLB lookup and Tag read.

The timing diagram of FIG. 1 illustrates the pipeline flow of two instructions: a memory load instruction ("Ld") and an add instruction ("Add"). The memory load instruction is a two-cycle instruction, the add instruction is a one-cycle instruction, and the add instruction is dependent on the load instruction. At time=0 (i.e., the first clock cycle) Ld is scheduled and dispatched (pipeline stage 12). At time=1, time=2 and time=3, Ld moves to pipeline stages 14, 16 and 18, respectively. At time=4, Ld is at pipeline stage 20. At time=5, Ld is at stage 22 and the hit/miss signal is generated. Scheduler 10 receives this signal. Finally at time=6, assuming a hit signal is received indicating that the data was correct, scheduler 10 schedules Add to stage 12, while Ld continues to stage 24, which is an additional pipeline stage. The add operation is eventually performed when Add is at stage 16. However, if at time=6 a miss signal is received, scheduler 10 will wait an indefinite number of clock cycles until data is received by accessing the next levels of the cache hierarchy.

As shown in the timing diagram of FIG. 1, Add, because it is dependent on Ld, cannot be scheduled until time=6, at the earliest. A latency of an instruction may be defined as the time from when its input operands must be ready for it to execute until its result is ready to be used by another instruction. Therefore, the latency of Ld in the example of FIG. 1 is six. Further, as shown in FIG. 1, scheduler 10 cannot schedule Add until it receives the hit/miss signal. Therefore, even if the time required to read data from a cache decreases with improved cache technology, the latency of Ld will remain at six because it is dependent on the hit/miss signal.

Reducing the latencies of instructions in a processor is sometimes necessary to increase the operating speed of a processor. For example, suppose that a part of a program contains a sequence of N instructions, $I_1, I_2, I_3, \ldots, I_N$. Suppose that $I_{n+1}$ requires, as part of its inputs, the result of $I_n$, for all n, from 1 to N−1. This part of the program may also contain any other instructions. The program cannot be executed in less time than $T=L_1+L_2+L_3+ \ldots +L_N$, where $L_n$ is the latency of instruction $I_n$, for all n from 1 to N. In fact, even if the processor was capable of executing a very large number of instructions in parallel, T remains a lower bound for the time to execute this part of this program. Hence to execute this program faster, it will ultimately be essential to shorten the latencies of the instructions.

Based on the foregoing, there is a need for a computer processor that can schedule instructions, especially dependent instructions, faster than known processors, and therefore reduces the latencies of the instructions.

SUMMARY OF THE INVENTION

One embodiment of the present invention is a computer processor that includes a multiplexer having a first input, a second input, and an output, and a scheduler coupled to the multiplexer first input. The processor further includes an execution unit coupled to the multiplexer output. The processor further includes a replay system having an output coupled to the second multiplexer input and an input coupled to the scheduler.

DETAILED DESCRIPTION

One embodiment of the present invention is a processor that speculatively schedules instructions and that includes a replay system. The replay system replays instructions that were not executed correctly when they were initially dispatched to an execution unit. Further, the replay system preserves the originally scheduled order of the instructions.

Figure 1:
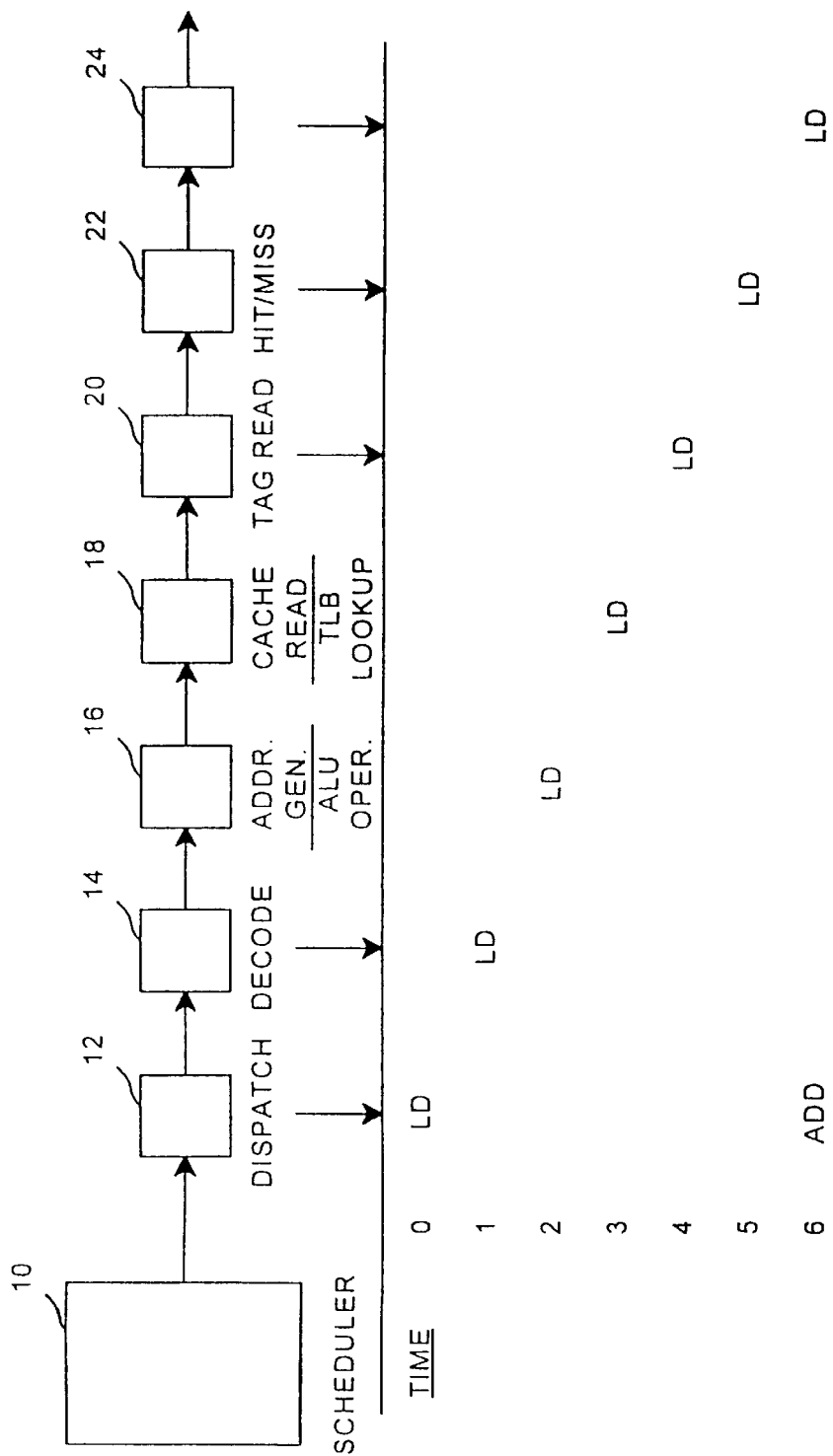
FIG. 1 is a block diagram of a prior art processor pipeline and timing diagram illustrating the delay caused by dependent instructions in most known processors.
Figure 2:
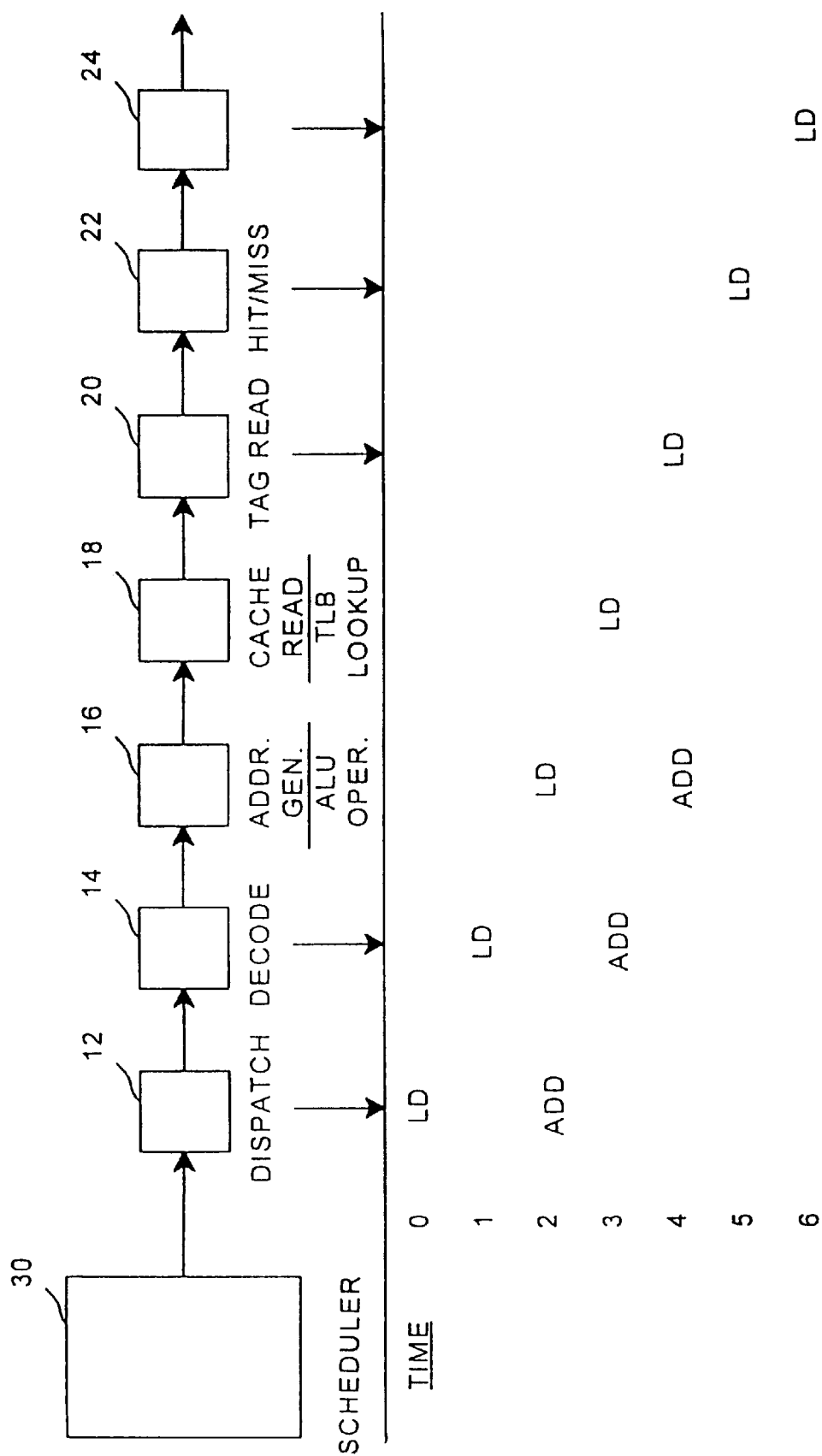
FIG. 2 is a block diagram of a processor pipeline and timing diagram in accordance with one embodiment of the present invention.

FIG. 2 is a block diagram of a processor pipeline and timing diagram in accordance with one embodiment of the present invention. In FIG. 2, a scheduler 30 schedules instructions to pipeline stages 12, 14, 16, 18, 20, 22 and 24, which are identical in function to the stages shown in FIG. 1. The timing diagram of FIG. 2 illustrates a two-cycle Ld followed by a one-cycle Add. Scheduler 30 speculatively schedules Add without waiting for a hit/miss signal from Ld. Therefore, Add is scheduled at time=2, so that a two stage distance from Ld is maintained because Ld is a two-cycle instruction. Add is eventually executed at time=4 when it arrives at stage 16, which is one cycle after Ld performs the cache read at stage 18.

By speculatively scheduling Add, scheduler 30 assumes that Ld will execute correctly (i.e., the correct data will be read from the cache at stage 18). A comparison of FIG. 2 with FIG. 1 illustrates the advantages of speculatively scheduling Add. Specifically, in FIG. 1, the Add instruction was not scheduled until time=6, thus Ld had a latency of six. In contrast, in FIG. 2 the Add instruction was scheduled at time=2, thus Ld had a latency of only two, or four less than the Ld in FIG. 1. Further, scheduler 30 in FIG. 2 has slots available to schedule additional instructions at time=3 through time=6, while scheduler 10 in FIG. 1 was able to only schedule one add instruction by time=6. Therefore, the present invention, by speculatively scheduling, reduces the latency of instructions and is able to schedule and process more instructions than the prior art.

However, the present invention must account for the situation when an instruction is speculatively scheduled assuming that it will be executed correctly, but eventually is not executed correctly (e.g., in the event of a cache miss). The present invention resolves this problem by having a replay system. The replay system replays all instructions that executed incorrectly.

Figure 3:
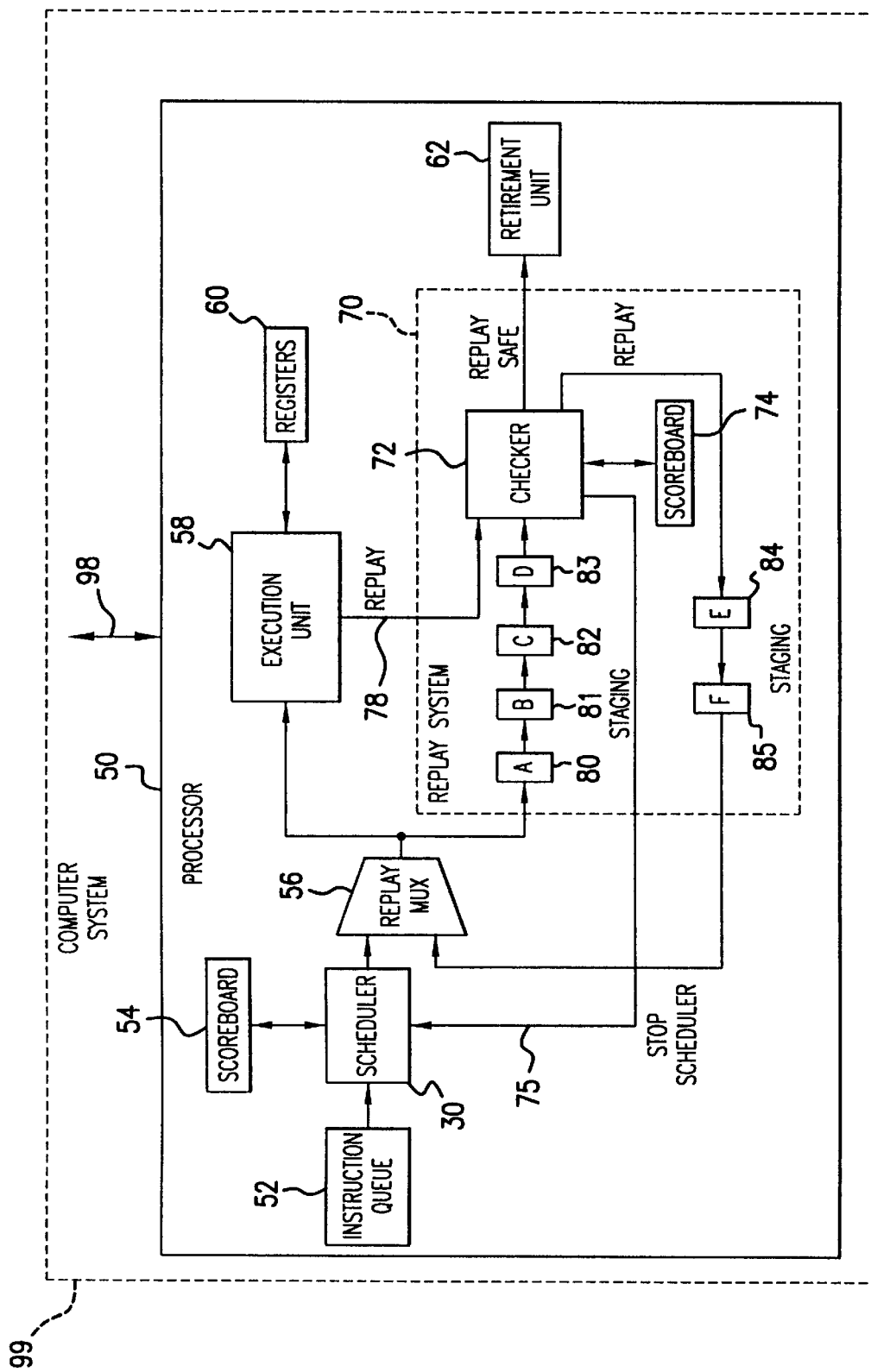
FIG. 3 is a block diagram of a processor in accordance with one embodiment of the present invention.

FIG. 3 is a block diagram of a computer processor in accordance with one embodiment of the present invention. The processor 50 is included in a computer system 99. Processor 50 is coupled to other components of computer 99, such as a memory device (not shown) through a system bus 98.

Processor 50 includes an instruction queue 52. Instruction queue 52 feeds instructions into scheduler 30. In one embodiment, the instructions are "micro-operations." Micro-operations are generated by translating complex instructions into simple, fixed length instructions for ease of execution.

Scheduler 30 dispatches an instruction received from instruction queue 52 when the resources are available to execute the instruction and when sources needed by the instruction are indicated to be ready. Scheduler 30 is coupled to a scoreboard 54. Scoreboard 54 indicates the readiness of each source (i.e., each register) in processor 50.

In one embodiment, scoreboard 54 allocates one bit for each register, and if the bit is a "1" the register is indicated to be ready. Scheduler 30 schedules instructions based on the scoreboard's status of the registers. For example, suppose a "Ld X→Reg-3" instruction (i.e., load the value in memory location "X" to register 3) is followed by an "Add Reg-3→Reg-4" instruction (i.e., add the value in register-3 to the value in register-4 and store it in register-4). The Add instruction is dependent on the Ld instruction because Reg-3 must be ready before the Add instruction is executed. Scheduler 30 will first schedule the Ld instruction, which is a two-cycle instruction. Scheduler 30 will then check scoreboard 54 on each cycle to determine if Reg-3 is ready. Scoreboard 54 will not indicate that Reg-3 is ready until the second cycle, because Ld is a two-cycle instruction. On the second cycle scheduler 30 checks scoreboard 54 again, sees the indication that Reg-3 is now ready, and schedules the Add instruction on that cycle. Therefore, through the use of scoreboard 54, scheduler 30 is able to schedule instructions in the correct order with proper spacing.

Scheduler 30 speculatively schedules instructions because the instructions are scheduled when a source is indicated to be ready by scoreboard 54. However, scheduler 30 does not determine whether a source is in fact ready before scheduling an instruction needing the source. For example, a load instruction may be a two-cycle instruction. This may mean that the correct data is loaded into a register in two cycles (not counting the dispatch and decode stage) if the correct data is found in a first level of memory (e.g., a first level cache hit). Scoreboard 54 indicates that the source is ready after two cycles. However, if the correct data was not found in the first level of memory (e.g., a first level cache miss), the source is actually not ready after two cycles. However, based on scoreboard 54, scheduler 30 will speculatively schedule the instruction anyway.

Scheduler 30 outputs the instructions to a replay multiplexer 56. The output of multiplexer 56 is coupled to an execution unit 58. Execution unit 58 executes received instructions. Execution unit 58 can be an arithmetic logic unit ("ALU"), a floating point ALU, a memory unit, etc. Execution unit 58 is coupled to registers 60 which are the registers of processor 50. Execution unit 58 loads and stores data in registers 60 when executing instructions.

Processor 50 further includes a replay system 70. Replay system 70 replays instructions that were not executed correctly after they were scheduled by scheduler 30. Replay system 70, like execution unit 58, receives instructions output from replay multiplexer 56. Replay system 70 includes two staging sections. One staging section includes a plurality of stages 80–83. The other staging sections includes stages 84 and 85. Therefore, instructions are staged through replay system 70 in parallel to being staged through execution unit 58. The number of stages 80–85 vary depending on the amount of staging desired in each execution channel.

Replay system 70 further includes a checker 72. Checker 72 receives instructions from stage 83 and determines whether each instruction has executed correctly. If the instruction has executed correctly, checker 72 declares the instruction "replay safe" and the instruction is forwarded to a retirement unit 62 where it is retired. Retiring instructions is beneficial to processor 50 because it frees up processor resources and allows additional instructions to start execution. If the instruction has not executed correctly, checker 72 replays or re-executes the instruction by sending the instruction to replay multiplexer 56 via stages 84 and 85.

In conjunction with sending the replayed instruction to replay multiplexer 56, checker 72 sends a "stop scheduler" signal 75 to scheduler 30. Stop scheduler signal 75 is sent at least one clock cycle in advance of the replayed instruction arriving at replay multiplexer 56. In one embodiment, stop scheduler signal 75 tells scheduler 30 to not schedule an instruction on the next clock cycle. In other embodiments, stop scheduler signal 75 tells scheduler 30 not to schedule an instruction on the clock cycle after the next clock cycle, or the clock cycle after that, etc., depending on how far in advance of the replayed instruction checker 72 sends stop scheduler signal 75. This creates an open slot for the replayed instruction that is output from replay multiplexer 56, and avoids two instructions being input to replay multiplexer 56 on the same clock cycle.

An instruction may execute incorrectly for many reasons. The most common reasons are a source dependency or an external replay condition. A source dependency can occur when an instruction source is dependent on the result of another instruction. Examples of an external replay condition include a cache miss, incorrect forwarding of data (e.g., from a store buffer to a load), hidden memory dependencies, a write back conflict, an unknown data/address, and serializing instructions.

Checker 72 may determine that an instruction should be replayed based on an external signal (replay signal 78). Execution unit 58 sends replay signal 78 to checker 72. Replay signal 78 indicates whether an instruction has executed correctly or not. Replay signal 78 is staged so that it arrives at checker 72 at the same point that the instruction in question arrives at checker 72. For example, if the instruction in question is a Ld, replay signal 78 is a hit/miss signal. The Ld instruction is staged in replay system 70 so that it arrives at checker 72 at the same time that the hit/miss signal for that Ld instruction is generated by execution unit 58. Therefore, checker 72 can determine whether to replay the Ld instruction based on the received hit/miss signal.

Checker 72 is also coupled to a scoreboard 74 which, like scoreboard 54, indicates which registers have valid data. Using scoreboard 74, checker 72 can determine that an instruction has not executed correctly because the data in the required register is not valid. For example, if a Ld instruction was a miss, and the next instruction received by checker 72 is an Add instruction that is dependent on the Ld instruction, checker 72, by using scoreboard 74, will determine that the Add instruction did not execute correctly because the data in the register needed by the Add instruction is not valid.

In one embodiment, processor 50 is a multi-channel processor. Each channel includes all of the components shown in FIG. 3. However, the execution unit 58 for each channel will differ. For example, execution unit 58 for one channel will be a memory unit, execution unit 58 for another channel will be an arithmetic unit, etc. Each channel includes its own replay system 70.

In one embodiment, processor 50 is a multi-threaded processor. In this embodiment, checker 72 causes some of the threads to be retired while others are replayed. Therefore, checker 72 allows execution unit 58 to be more efficiently used by many threads.

Figure 4:
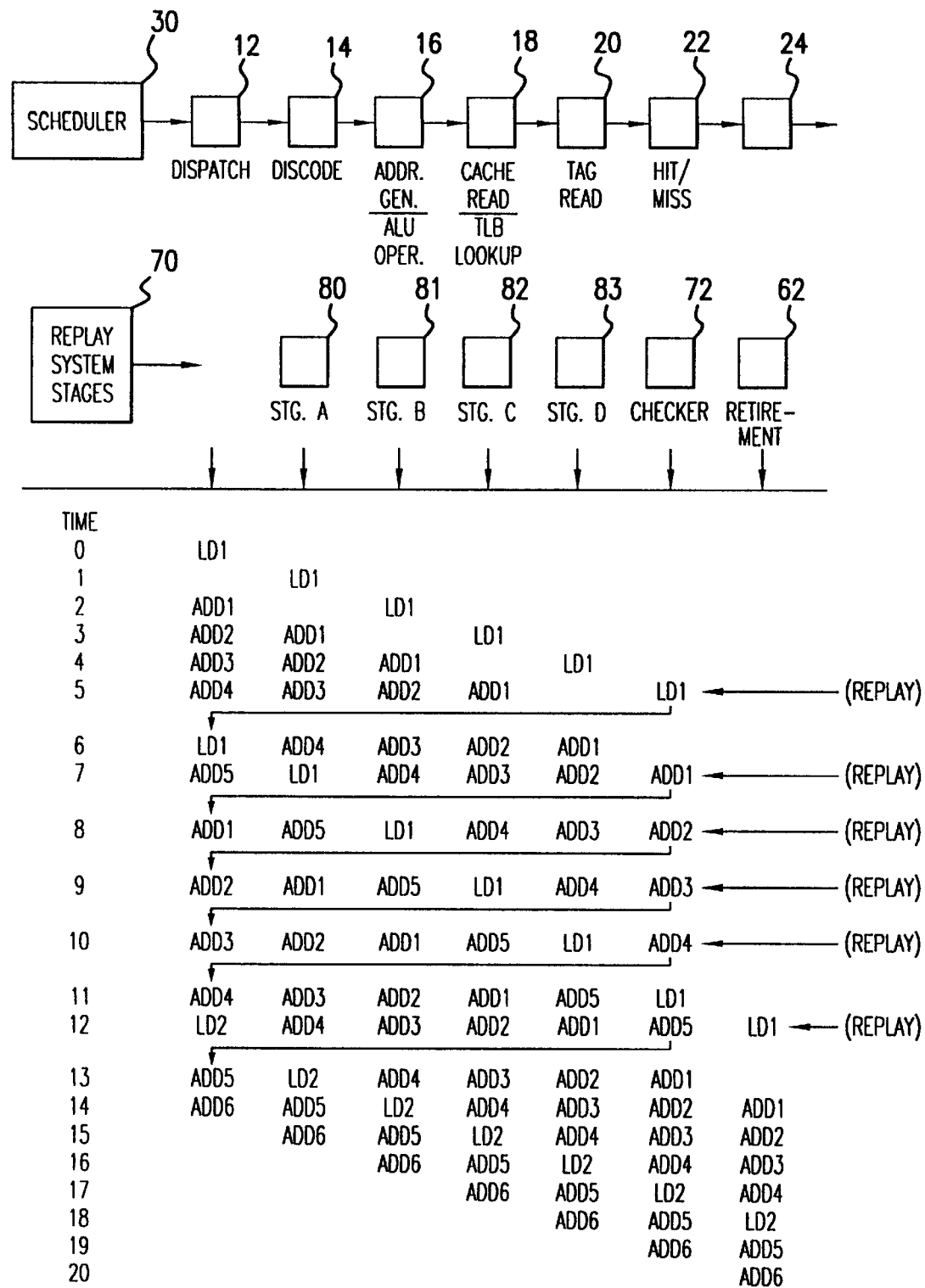
FIG. 4 is a block diagram illustrating the stages of an execution unit and the parallel stages of a replay system in accordance with one embodiment of the present invention.

FIG. 4 is a block diagram illustrating the stages of execution unit 58 and the parallel stages of replay system 70 in accordance with one embodiment of the present invention. For example, an instruction at decode stage 14 of execution unit 58 will, in parallel, be at stage A (i.e., stage 80) of replay system 70. Further, an instruction at hit/miss stage 22 of execution unit 58 will, in parallel, be at checker 72 of replay system 70. For simplicity purposes, the replay system whose stages are shown in FIG. 4 does not include stages E and F (i.e., stages 84 and 85) of replay system 70 of FIG. 3. Therefore, instructions that are replayed by checker 72 are re-dispatched at replay multiplexer 56 on the next clock cycle without being staged.

FIG. 4 also illustrates a timing diagram of the following set of instructions, with the following dependencies:

| Program Order | Dependencies |
| --- | --- |
| Ld1 | |
| Add1 | on Ld1 |
| Add2 | on Add1 |
| Add3 | on Add2 |
| Add4 | on Add3 |
| Ld2 | |
| Add5 | on Add4 |
| Add6 | on Add5 |

The load instructions ("Ld") are two-cycle instructions and the add instructions ("Add") are one cycle instructions. As shown, Add1 is dependent on Ld1, Add2 is dependent on Add1, etc.

Referring to the timing diagram of FIG. 4, at time=0 Ld1 is dispatched. At time=1, Ld1 moves to decode 14 stage of execution unit 58, and stage A of replay system 70. At time=2, Add1 is scheduled, because Ld1 is a two-cycle instruction. Similarly, at time=3 and 4 Add2 and Add3 are scheduled, respectively. At time=5, Ld1 is at hit/miss stage 22 and at checker 72 of the replay system. Assume a miss signal is received at time=5. The miss signal (which is replay signal 78 of FIG. 3) is received by checker 72. Checker 72, based on the miss signal, determines that Ld1 executed incorrectly and replays Ld1 at time=5. Checker 72, also at time=5, sends a stop scheduler signal 75 to scheduler 30 which signals scheduler 30 to not schedule an instruction at the next cycle (i.e., at time=6).

At time=6, Ld1 returns to dispatch stage 12. Note that scheduler 30 did not schedule an instruction at time=6 so that Ld1 was able to occupy the vacant slot. At time=7, Add5 is scheduled and Add1 is at checker 72. Checker 72, using scoreboard 74, determines that Add1 executed incorrectly because Add1 was dependent on Ld1. Because Ld1 executed incorrectly, scoreboard 74 indicates that the data in the register needed by Add1 is invalid. Therefore, checker 72 replays Add1 at time=7, while sending another stop scheduler signal 75 to scheduler 30. Similarly, at time=8 checker 72 replays Add2, at time=9 checker 72 replays Add3, and at time=10 checker 72 replays Add4.

At time=11, Ld1 is once again at checker 72. This time checker 72 receives a hit signal indicating that Ld1 executed correctly. Therefore, at time=12, since no instructions were replayed by checker 72 at time=11, scheduler 30 can finally schedule Ld2 (multiple loads can be in the pipeline at the same time). Meanwhile, Ld1 moves to retirement unit 62.

Further, at time=12, checker 72 determines that Add5 executed incorrectly because Add5 is dependent on Ld1. Therefore, checker 72 replays Add5 at time=12.

At time=13, Add5 returns to dispatch 12, and Add1 is at checker 72. This time checker 72 determines that Add1 executed correctly because scoreboard 74 indicates that the register has valid data. At time=14, Add6 is dispatched and Add1 is retired. At times=15 through times=20, the remaining instructions in the pipeline execute correctly and eventually are all retired.

As shown in FIG. 4, the scheduled order of the instructions are always preserved by replay system 70. For example, Add1, Add2 and Add3 always execute after Ld1 and Add1 always remains two stages behind Ld1. Further, replay system 70, through stop scheduler signal 75, inserts replayed instructions in empty slots when scheduler 30 does not schedule an instruction.

Figure 5:
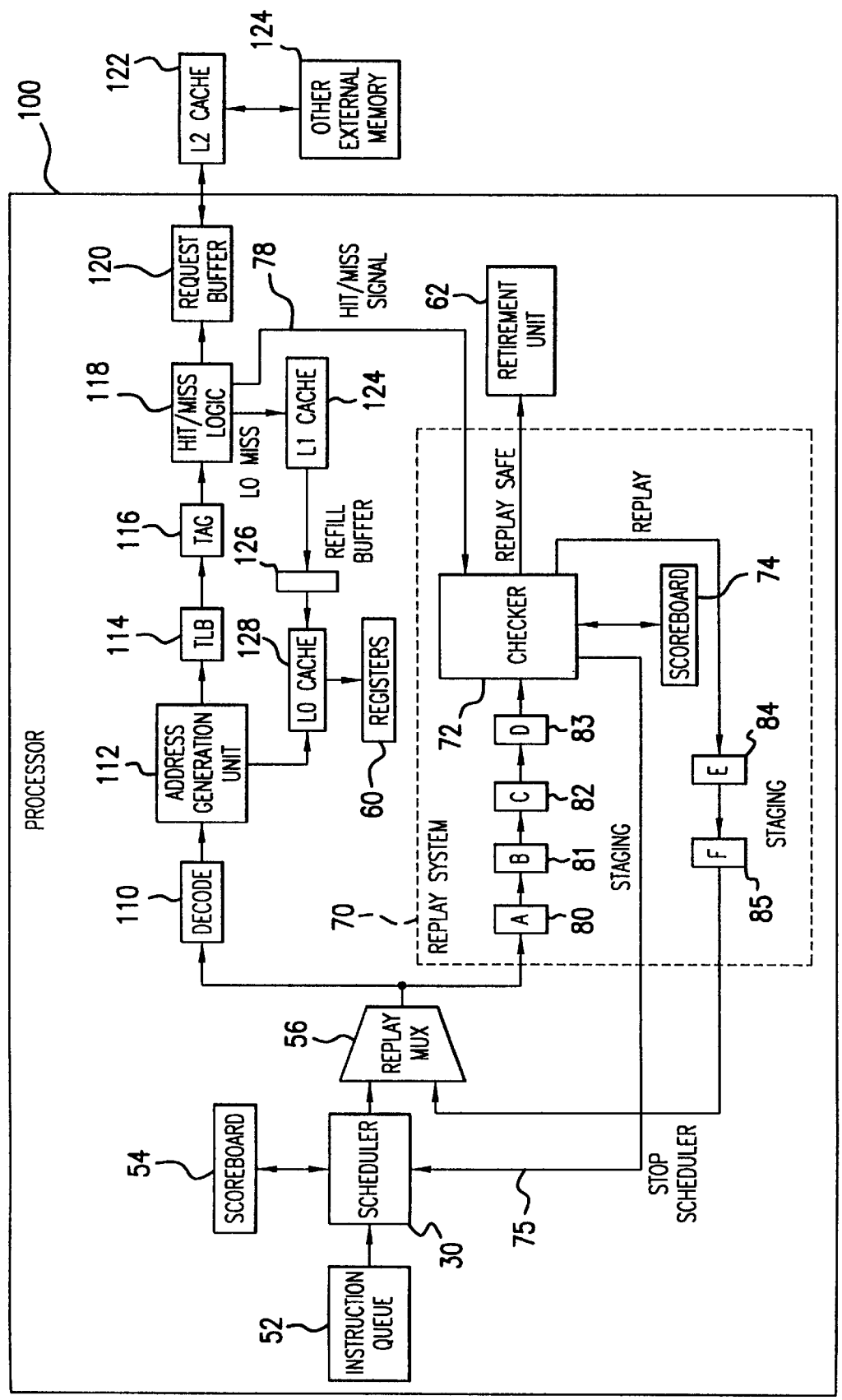
FIG. 5 is a block diagram of a processor in accordance with another embodiment of the present invention.

FIG. 5 is a block diagram of a processor 100 in accordance with another embodiment of the present invention. FIG. 5 illustrates an embodiment in which execution unit 58 of FIG. 3 is a memory load unit, and each stage of the memory load unit is shown. Further, FIG. 5 illustrates some components of a memory subsystem needed by the memory load unit.

When a memory load instruction is scheduled, or dispatched, by scheduler 30 in FIG. 5, the instruction is output by replay multiplexer 56 and sent in parallel to the memory load unit and replay system 70. In the memory load unit, the instruction is first decoded and source registers are read in a decode unit 110. A memory address is generated by an address generation unit 112. The generated address is sent to a TLB unit 114, which performs a lookup of the TLB and generates a physical Tag address. The generated address is also sent to L0 cache 128. L0 cache 128 is the first level cache of processor 100, and therefore provides the quickest access. In one embodiment, L0 cache 128 is on the same die as processor 100. The data retrieved from L0 cache 128 based on the generated address is sent to the register in registers 60 specified in the load instruction.

The physical address generated by TLB unit 114 is sent to Tag memory 116. The cache Tag read from Tag memory 116 is sent to Hit/Miss logic 118, which determines whether there was a hit or miss of L0 cache 128. The hit or miss determination is sent to checker 72 on line 78 which functions as the replay signal for checker 72. Further, if there was an L0 cache 128 miss, hit/miss logic 118 determines whether there is a hit or miss of an L1 cache 124 for the physical address. L1 cache 124 is a second level cache of processor 100 and typically takes 4–16 times as long to access compared with L0 cache 128. In one embodiment, L1 cache 124 is on the same chip as processor 100. Data is retrieved from L1 cache 124 and sent on a refill path to a refill buffer 126 and then is stored in L0 cache 128.

If there was an L1 cache 124 miss, a request buffer requests the data from the next level of memory, L2 cache 122. L2 cache 122 is external to processor 100, and requires access to an external bus. In the event of an L2 cache 122 miss, the data will be retrieved from other external memory 124 which includes main memory, disk drives, and all other memory external to processor 100. Accessing data from L2 cache 122 or other external memory 124 typically takes at least 4–16 times as long to access compared to L1 cache 124. Data retrieved from L2 cache 122 or other external memory 124 refills L1 cache 124 and L0 cache 128 via a refill path not shown in FIG. 5.

In one embodiment of processor 100, stages 80–85 stage instructions through replay system 70 so that it is optimized for a memory load instruction. Specifically, in this embodiment most memory load instructions (approximately 90%) receive an L0 cache 128 hit, and therefore the memory load instruction will not be replayed. Of the memory load instructions that received an L0 cache 128 miss, most of these instructions (approximately 70% of the 10% remaining instructions) receive an L1 cache 124 hit. Therefore, replay system 70 is optimized for an L0 cache 128 miss and an L1 cache 124 hit.

Figure 6:
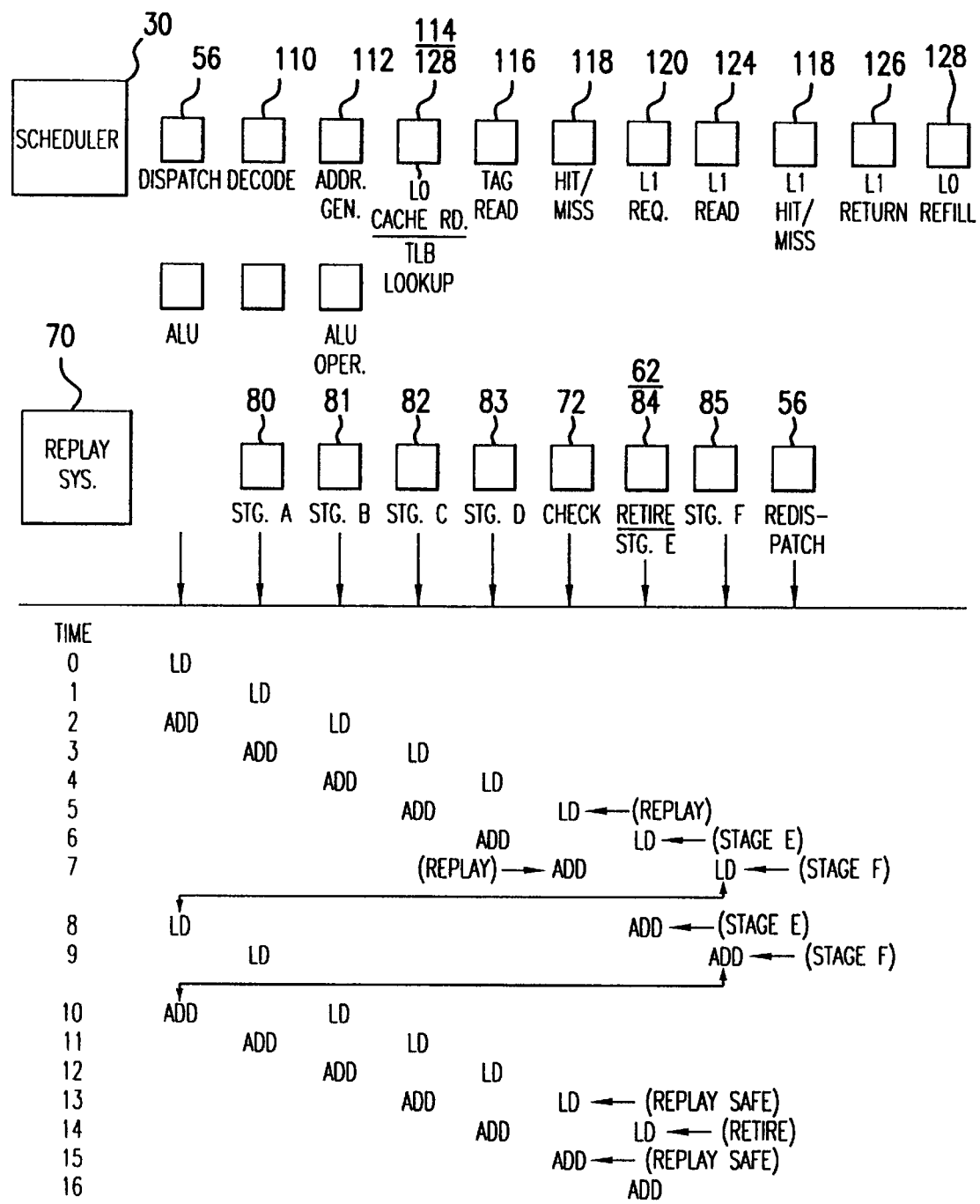
FIG. 6 is a block diagram of a memory load unit pipeline and memory subsystem of the processor, and the parallel stages of the replay system and an ALU unit in accordance with one embodiment of the present invention.

The effect of this optimization is illustrated in FIG. 6. FIG. 6 is a block diagram of the memory load unit pipeline and memory subsystem of processor 100, and the parallel stages of replay system 70 and an ALU unit. For example, a memory load instruction is at the address generation stage 112 of the memory load pipeline, while in parallel the instruction is at stage B (i.e., staging queue 81) of replay system 70. In addition to the pipeline stages shown in FIG. 4, the memory load unit pipeline of FIG. 6 includes the stages of L1 cache request 120, L1 cache read 124, L1 hit/miss indication 118, L1 return 126 (i.e., the data is returned from L1 cache 124 to refill buffer 126) and L0 cache refill 128. The indicator numbers in the pipeline correspond to the component of FIG. 5 that is implementing the stage function.

FIG. 6 also illustrates a timing diagram of a two-cycle load instruction ("Ld") followed by a dependent add instruction ("Add") for the common situation of a L0 cache 128 miss and a L1 cache 124 hit. At time=0, Ld is dispatched by scheduler 30. At time=1, Ld is at decode 110 of the memory load unit, and at stage A (i.e., stage queue 80) of replay system 70. At time=2, Add is dispatched. At time=3 and 4, Ld and Add advance through their respective pipelines. At time=5, Ld is at checker 72. Checker 72 receives a miss signal at time=5 (because of the L0 cache 128 miss) and therefore replays Ld.

At time=7, Ld is at stage E (i.e., staging queue 84) of replay system 70 and at request buffer 120 of the memory load unit performing an L1 cache 124 request (because there was an L0 cache 128 miss). At time=7, Add is replayed by checker 72 and Ld is at stage F (i.e., staging queue 85), and the memory subsystem performs an L1 read 124. At time=8, Ld is re-dispatched, and the memory load system performs a L1 cache hit/miss 118. Also at time=8, an L1 cache hit is received. At time=9, replayed Ld is at decode 110 and at stage A. Meanwhile, in the memory subsystem an L1 return 126 is also performed at time=9. At time=10, Add is dispatched again and an L0 refill 128 is performed by the memory subsystem. At time=11, Ld is at L0 cache 128 read. Of course, because L0 cache 128 refill was performed at the previous cycle (at time=10), the correct data will now be retrieved from L0 cache 128 and stored in the register. Therefore, at time=13 an L0 cache 128 hit will be received by checker 72 and Ld will now be replay safe. At time=14, 15, and 16, Ld and Add are subsequently retired.

As shown in FIG. 6, stages E and F delay Ld's re-dispatch two cycles. This enables the L0 cache refill to occur just in time for the Ld to perform an L0 cache read the second time around. Ld then gets an L0 cache hit, and does not have to be replayed again. If replay system 70 was not optimized, Ld may perform an L0 cache read before L0 cache is refilled. Ld will then have to be replayed again, which delays the correct execution of Ld and prevents other threads from using resources. Thus, replay system 70 is optimized so for the most common replay situation, an L0 cache miss and an L1 cache hit, Ld has to be replayed only once.

As described, the processor in accordance with one embodiment of present invention includes a replay system 70 that replays instructions. Replay system 70 signals scheduler 30 to not schedule an instruction so as to create a slot for inserting a replayed instruction. Therefore the original scheduled order of the instructions is preserved. Further, replay system 70 is optimized so when the most common memory load instruction replay situation occurs (i.e., an L0 cache 128 miss and an L1 cache 124 hit) the instruction is replayed at most one time.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A computer processor comprising:
    a multiplexer having a first input, a second input, and an output;
    a scheduler coupled to said multiplexer first input;
    an execution unit coupled to said multiplexer output; and
    a replay system having an output coupled to said second multiplexer input and an input coupled to said scheduler;
    wherein said replay system comprises:
        a first staging section coupled to said multiplexer output; and
        a checker coupled to said first staging section, said checker having a replay safe output and a replay output coupled to said multiplexer second input.

2. The processor of claim 1, wherein said replay system is adapted to replay a first instruction that has not correctly executed by sending a stop scheduler signal to said scheduler and sending said first instruction to said multiplexer.

3. The processor of claim 2, wherein said scheduler does not dispatch a second instruction for at least one clock cycle in response to receiving said stop scheduler signal.

4. The processor of claim 3, wherein said first instruction is dispatched in place of said second instruction.

5. The processor of claim 1, said replay system further comprising:
    a second staging section coupled to said replay output and said multiplexer second input.

6. The processor of claim 1, further comprising:
    a retirement unit coupled to said replay safe output.

7. The processor of claim 1, said processor comprising a plurality of registers, wherein said replay system comprises a scoreboard that indicates a status of said plurality of registers.

8. The processor of claim 1, wherein said execution unit is a memory load unit.

9. The processor of claim 1, wherein said checker is adapted to receive a replay signal from said execution unit.

10. The processor of claim 5, wherein said execution unit is a memory load unit, said processor further comprising:
    a memory subsystem, said memory subsystem comprising:
        a first level cache coupled to said memory load unit; and
        a second level cache coupled to said first level cache;
        wherein said memory subsystem includes a first delay time to generate a hit/miss signal for said first level cache, and a second delay time to refill said first level cache from said second level cache; and
        wherein said replay system is such that a memory load instruction is received by said checker at a third delay time that is approximately equal to said first delay time.

11. The processor of claim 10, wherein said replay system is such that said memory load instruction, when replayed, is received by said execution unit at a fourth delay time that is approximately equal to or greater than said second delay time.

12. The processor of claim 1, wherein said replay system replays a plurality of instructions and preserves an originally scheduled order of said plurality of instructions by having an equal number of pipeline stages as said execution unit.

13. The processor of claim 1, further comprising a first channel and a second channel;
    said first channel comprising said multiplexer, said scheduler, said execution unit, and said replay system; and
    said second channel comprising a second multiplexer, a second scheduler, a second execution unit, and a second replay system.

14. The processor of claim 1, wherein said scheduler speculatively schedules a plurality of instructions.

15. The processor of claim 2, wherein said first instruction has not correctly executed because of an external condition.

16. The processor of claim 2, wherein said first instruction has not correctly executed because of a source dependency.

17. A method of processing a computer instruction comprising the steps of:
    (a) dispatching the instruction, wherein the instruction is received by an execution unit and, in parallel, a replay system having a checker;
    (b) determining whether the instruction executed correctly at the checker, comprising the steps of:
        (b-1) receiving a replay signal from the execution unit; and
        (b-2) staging the instruction in said replay system before the instruction is received by the checker so that the instruction is received by the checker at approximately the same time as the replay signal is received by the checker; and
    (c) repeating step (a) if the instruction did not execute correctly.

18. The method of claim 17, wherein step (c) comprises the steps of;
    (c-1) outputting the instruction to a retirement unit if the checker determines that the instruction executed correctly; and
    (c-2) outputting the instruction to a multiplexer and outputting a stop scheduler signal to a scheduler if the checker determines that the instruction did not execute correctly.

19. The method of claim 17, further comprising the step of:
    retrieving data from a first level cache having a first delay time to generate a hit/miss signal for said first level cache;
    wherein step (b-1) comprises the step of staging the instruction so that the instruction is received by the checker at a third delay time that is approximately equal to said first delay time.

20. The method of claim 19, further comprising the step of:
    refilling the first level cache from a second level cache, said second level cache having a second delay time to refill said first level cache; and
    staging the instruction output from said checker so that said instruction is received by said execution unit a second time at a fourth delay time that is approximately greater than or equal to said second delay time.

21. A computer system comprising:
a bus;
a memory coupled to said bus and storing a plurality of instructions; and
a processor coupled to said bus, said processor comprising:
   a multiplexer having a first input, a second input, and an output;
   a scheduler coupled to said multiplexer first input;
   an execution unit coupled to said multiplexer output, said execution unit adapted to receive the plurality of instructions from said multiplexer; and
   a replay system having an output coupled to said second multiplexer input and an input coupled to said scheduler;
wherein said replay system comprises:
   a first staging section coupled to said multiplexer output; and
   a checker coupled to said first staging section, said checker having a replay safe output and a replay output coupled to said multiplexer second input.

22. The computer system of claim 21, wherein said replay system is adapted to replay a first instruction that has not correctly executed by sending a stop scheduler signal to said scheduler and sending said first instruction to said multiplexer.

23. The computer system of claim 22, wherein said scheduler does not dispatch a second instruction for at least one clock cycle in response to receiving said stop scheduler signal.

24. The computer system of claim 21, wherein said first instruction is dispatched in place of said second instruction.

25. The computer system of claim 21, wherein said execution unit is a memory load unit, said processor further comprising:
   a memory subsystem, said memory subsystem comprising:
      a first level cache coupled to said memory load unit; and
      a second level cache coupled to said first level cache;
      wherein said memory subsystem includes a first delay time to generate a hit/miss signal for said first level cache, and a second delay time to refill said first level cache from said second level cache; and
      wherein said replay system is adapted so that a memory load instruction is received by said checker at a third delay time that is approximately equal to said first delay time.

26. The computer system of claim 25, wherein said replay system is adapted so that said memory load instruction, when replayed, is received by said execution unit at a fourth delay time that is approximately greater than or equal to said second delay time.

* * * * *